United States Patent [19]

Stoakley et al.

[11] Patent Number: 4,473,674

[45] Date of Patent: Sep. 25, 1984

[54] PROCESS FOR IMPROVING MECHANICAL PROPERTIES OF EPOXY RESINS BY ADDITION OF COBALT IONS

[75] Inventors: Diane M. Stoakley; Anne K. St. Clair, both of Poquoson, Va.

[73] Assignee: The United States of America as represented by the Administrator of the National Aeronautics and Space Administration, Washington, D.C.

[21] Appl. No.: 548,584

[22] Filed: Nov. 3, 1983

[51] Int. Cl.$^3$ ..................... C08G 59/70; C08G 59/32; C08L 63/00
[52] U.S. Cl. .................................. 523/454; 523/458; 525/484; 528/92; 528/407
[58] Field of Search .................. 528/92, 407; 523/454, 523/458; 525/484

[56] References Cited

U.S. PATENT DOCUMENTS 3,792,016  2/1974  Hill et al. ............................. 528/92
3,812,214  5/1974  Markovitz ...................... 528/361 X
4,405,765  9/1983  Demmler et al. ................ 528/92 X Primary Examiner—Earl A. Nielsen
Attorney, Agent, or Firm—Howard J. Osborn; John R. Manning; Wallace J. Nelson

[57] ABSTRACT

A resin product useful as an adhesive, composite or casting resin and the process for preparing same to improve the flexural strength mechanical property characteristics thereof. This improved flexural strength is attained with little or no change in density, thermal stability or moisture resistance by chemically incorporating 1.2 to 10.6% by weight Co(III) ions in an epoxidized resin system.

15 Claims, No Drawings

PROCESS FOR IMPROVING MECHANICAL PROPERTIES OF EPOXY RESINS BY ADDITION OF COBALT IONS

ORIGIN OF THE INVENTION

The invention described herein was made by employees of the United States Government and may be manufactured and used by or for the Government for governmental purposes without the payment of any royalties thereon or therefor.

BACKGROUND OF THE INVENTION

A broad spectrum of thermoset epoxide resins is currently being used by the aerospace community for applications on both commercial and military aircraft, primarily as composite matrices and adhesives. As a class, epoxies are extremely versatile materials offering such features as ease of processing, chemical resistance, high adhesive strength, low density, and high electrical insulation. One particular drawback associated with highly crosslinked-epoxy resin systems, however, is their brittle nature and accompanying low mechanical strengths.

Many research studies have been devoted to the purpose of gaining an understanding of the effect of network morphology on the mechanical behavior of epoxies. It is known that high internal stresses can be developed during curing, especially when the curing rate is low. Numerous catalysts have been used in epoxy resin systems to accelerate their cure including the commercially important Lewis acid catalyst, boron trifluoride monoethylamine, $BF_3 \cdot NH_2(C_2H_5)$. This catalyst, however, has the disadvantage of causing both corrosion of any adjacent metallic materials and/or an increase in moisture absorption in high humidity. Various metal acetylacetonates have also been used as accelerators for 1,2-epoxy resins in combination with phenolic accelerators (U.S. Pat. No. 3,812,214) and for traditionally slow curing epoxy-anhydride resins (*J. Appl. Polym. Sci.*, 26, 979 (1981) Westinghouse R and D Center). By the present invention a cobalt ion-containing amine-cured epoxy is produced wherein the cobalt ions are believed to not only accelerate the epoxy cure, but offer the additional advantage of altering the resulting network morphology to provide improved mechanical properties. It is anticipated that this improved process and epoxy formulation will prove useful as a composite matrix resin, adhesive or casting resin for numerous aerospace applications including advanced aircraft, and the like.

It is therefore an object of the present invention to provide a novel process for improving the mechanical strength of epoxy resins by the addition of cobalt ions therein.

Another object of the present invention is to provide a process for preparing a lightweight epoxy matrix resin, adhesive, or casting resin with improved mechanical strength for applications on aircraft.

An additional object of the present invention is to provide a novel epoxy resin having improved mechanical strength property characteristics when utilized as a composite matrix, adhesive or casting resin.

BRIEF DESCRIPTION OF THE INVENTION

According to the present invention, the foregoing and additional objects are attained by providing a cobalt ion-containing epoxy which has improved mechanical properties and which exhibits little or no change in density, thermal stability or moisture resistance.

A first process for producing a cobalt ion-containing epoxy with improved mechanical properties according to the present invention involves the following steps: (1) addition of cobalt ions to an epoxy resin system in a solvent; (2) degassing of the cobalt ion-containing resin at 120°–135° C. under vacuum; (3) cure at 150° to thermoset the resin; and (4) post cure of the cobalt ion-containing epoxy at 177° C.

A second process for producing a cobalt ion-containing epoxy with improved mechanical properties according to the present invention involves the following steps: (1) combination of epoxides and solvent; (2) combination of cobalt ions, diamine curing agent and solvent to form a premix; (3) addition of the premix to the epoxide solution; (4) degassing of the cobalt ion-containing resin at 115°–125° C.; (4) cure at 150° C.; and (5) post cure at 177° C.

A third process for producing a cobalt ion-containing epoxy with improved mechanical properties according to the present invention involves the following steps: (1) combination of an epoxide, a diamine curing agent and a solvent; (2) combination of cobalt ions, an epoxidized phenolic novolac and a solvent to form a premix; (3) addition of the premix to the epoxy/diamine solution (4) degassing of the cobalt ion-containing resin at 120°–125° C.; (4) cure at 150° C.; and (5) post cure at 177° C.

Preparation of the cobalt ion-containing epoxy resin according to the first process of the present invention involves the addition of cobalt ions in the form of tris-(acetylacetonato) cobalt(III) ($Co(acac)_3$) at concentrations of 1.2 to 10.6% by weight to Narmco 5208, a commercially formulated and prepared epoxide resin system containing bis-4-N,N-bis(2,3-epoxypropyl)-phenylmethane or tetraglycidylmethylenedianiline (TGMDA), its oligomers and various isomers (e.g., Ciba Geigy MY-720) to which a low boiling solvent such as methyl ethyl ketone (MEK) has been added at 35-40% by weight.

5208 epoxy resin has been widely used by the aerospace industry as a composite matrix resin and has been found to be formulated by 28 parts (by weight) of 4,4'-diaminodiphenylsulfone (DDS) curing agent and 8.2 parts (by weight) phenolic novolac (SU-8) for each 100 parts (by weight) of the major component, tetraglycidyl 4,4'-diaminodiphenylmethane (MY-720).

Preparation of the cobalt ion-containing epoxy resin according to the second process of the present invention involves the room temperature formation of an epoxy solution comprised of a TGMDA epoxide (61.5% by weight), 5.0% by weight of an epoxidized phenolic novolac, an example of which is commercially known as SU-8 and available from the Celenese Corporation, and a low boiling solvent such as methyl ethyl ketone (MEK) (33.5% by weight). A premix is prepared separately containing $Co(acac)_3$ (1.3 to 11.6% by weight), an aromatic diamine curing agent such as 4,4'-diaminodphenylsulfone, (DDS) (20.1-22.4% by weight) and a low boiling solvent such as methyl ethyl ketone (6.8-7.6% by weight). The Co/amine premix is added to the epoxy solution such that this final mixture contains 43.5-46.2% premix and 53.8-56.5% epoxy solution. The reaction producing the composition of the cobalt ion-containing epoxy resin according to the second process of the present invention is schematically represented by:

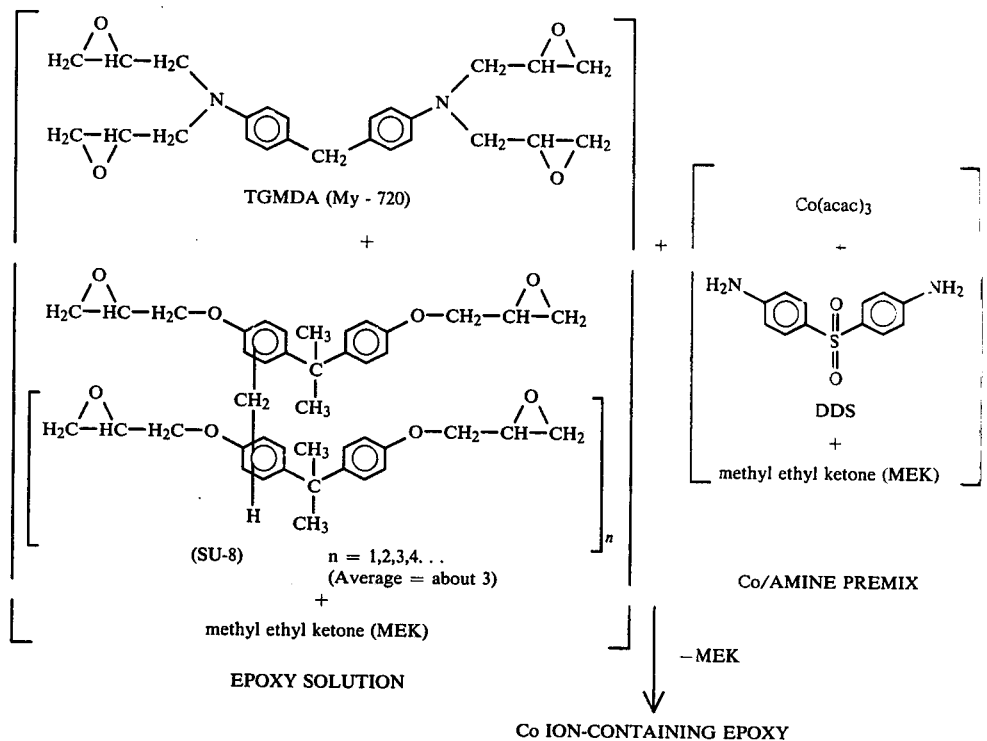

EPOXY SOLUTION

Co/AMINE PREMIX

Co ION-CONTAINING EPOXY

Preparation of the cobalt ion-containing epoxy resin according to the third process of the present invention involves the room temperature formation of a solution comprised of a TGMDA epoxide (60.0% by weight), an aromatic diamine curing agent such as DDS (14.3% by weight), and a low boiling solvent such as methyl ethyl ketone (34.7% by weight). A premix is prepared separately containing Co(acac)$_3$ (6.9–42.5% by weight), an epoxidized phenolic novolac, for example, SU-8 (21.6–35.0% by weight) and a low boiling solvent such as methyl ethyl ketone (35.9–58.1% by weight). The Co/epoxidized novolac premix is added to the epoxy/amine solution such that the final mixture contains 10.7–16.2% premix and 83.8–89.3% epoxy/amine solution. The composition of the cobalt ion-containing epoxy resin according to the third process of the present invention is schematically represented by:

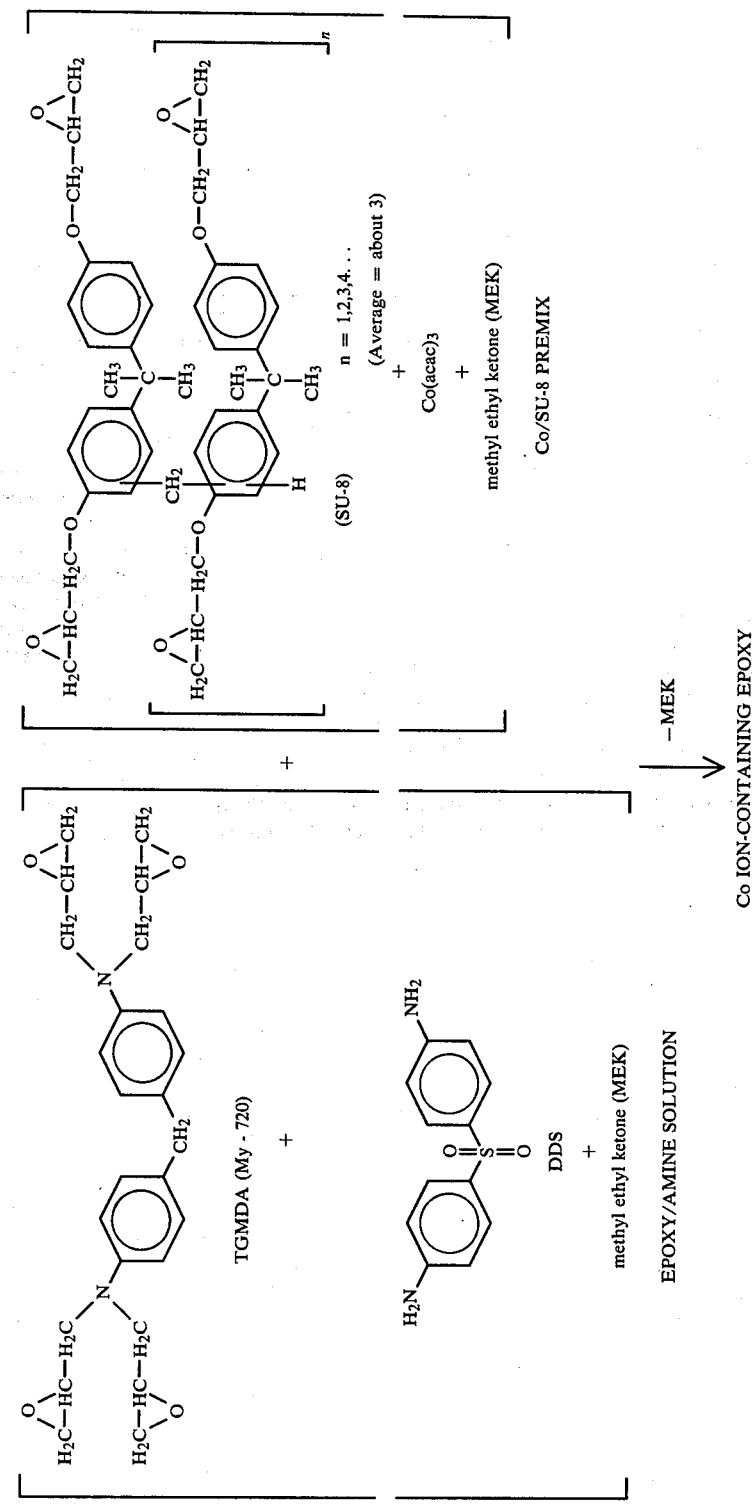

The specific examples set forth in the present invention are based on TGMDA epoxides. Suitable resins include any liquid or solid tetraglycidylmethylenedianiline epoxy resins such as those sold under trademarks Narmco 5208, Hercules 3502, Fiberite 934, and Hexcel 263 or other epoxy resins based on MY-720 by Ciba Geigy Corporation, e.g. ARALDITE MY-720. TGMDA epoxy resin is a tetrafunctional epoxide that cures to a very highly crosslinked polymer. The improved mechanical properties achieved with the TGMDA-based cobalt ion-containing epoxies were not attained with the addition of cobalt ions to a more linear difunctional epoxy resin.

The ultimate success of improved mechanical properties for epoxy resins according to the present invention appears dependent upon the presence of the $Co(acac)_3$-tris(acetylacetonato) cobalt (III) complex. However, it is possible that other Co(III)-containing salts, complexes, or organometallic complexes may prove useful in the present invention.

Success of the present invention also appears dependent upon the solubility of the cobalt complex in the epoxy resin. Because of the solubility of the $Co(acac)_3$ in the epoxy resins used herein, Co(III) ions are able to chemically interact with the polymer chain rather than acting as an inert filler. Although concentrations of $Co(acac)_3$ range from 1.2 to 10.6% by weight in the epoxies of the specific examples used in the present invention, greater concentrations could foreseeably be used if the acceleration of the epoxy cure could be controlled. However, a formulation was prepared with 12.9% $Co(acac)_3$ that had an uncontrolled exotherm during the cure.

Although methyl ethyl ketone (MEK) was used as a solvent in the exemplary specific example formulations described herein, other solvents such as acetone, toluene, xylene, methyl isobutyl ketone or any other low-boiling solvent that is miscible with the epoxide resin are considered useful and operable in the present invention. The quantity of solvent (40–50% by weight) used in preparing the Co(III) ion-containing epoxies described herein need only be sufficient to dissolve the metal complex or allow ease in fabrication of castings by reducing the resin viscosity. However, if a solvent is used in preparing the resins of the present invention, thorough degassing in a vacuum oven is required to obtain good quality castings.

If a solvent is not used to aid in the dissolution of the metal complex then slight heating is necessary to dissolve the $Co(acac)_3$ in the epoxide and care must be taken to prevent premature gelation due to the catalytic nature of the cobalt complex.

Although the diamine curing agent used in processes one, two and three of the present invention (as described hereinbefore) was DDS (4,4'-diaminodiphenylsulfone), other conventional di- and tri-functional amine curing agents could foreseeably be used by those skilled in the art and are considered within the scope of the present invention. For example, any isomers of diaminodiphenyl methane, diaminobenzophenone, oxydianiline, diaminodiphenylsulfide or phenylenediamine are considered applicable curing agents for practice of the present invention.

Solid cast discs prepared from the Co(III) ion-containing epoxy resins of the present invention were tested for flexural strength and stiffness in a three-point bending mode at an average span/thickness of 16/1. Results of these tests are shown in Table I. The 2¼ inch diameter, 50 mil thick epoxy discs were cut in ¼" wide bars for flexural testings. Incorporation of cobalt ions into epoxies listed in Table I increased the flexural strength of these resins by 10–95%.

TABLE I

| Epoxy Resin Composition | % Co(acac)₃ | Mole Ratio of Co (III) Ions to MY-720 Repeat Unit | Flex. Str. (ksi) | Flex. Mod. (ksi) |
|---|---|---|---|---|
| Narmco 5208 by 1st process | 0 | 1 | 8.2 | .60 |
|  | 5.6 | :10 | 5.4 | .20 |
| MY-720/ DDS/SU-8 by 2nd process | 0 | 1 | 7.4 | .33 |
|  | 1.2 | :50 | 5.1 | .79 |
|  | 2.3 | :25 | 1.9 | .13 |
|  | 5.6 | :10 | 9.2 | .93 |
|  | 10.9 | :5 | 4.3 | .39 |
| MY-720/ DDS/SU-8 by 3rd process | 0 | 1 | 7.4 | .33 |
|  | 5.6 | :10 | 5.3 | .18 |

An additional experiment was conducted to evaluate the scope of the present invention. Cobalt ions in the form of $Co(acac)_3$ were incorporated into a more linear difunctional epoxide resin EPON-828, a Shell Chemicals Co. product. $Co(acac)_3$ was added to a preheated EPON-828 resin at a concentration of 3.5% by weight. DDS curing agent was added to the Co ion-containing epoxy mixture and the resin was poured into an aluminum pan and cured two hours at 140° C. and post cured four hours at 204° C. The resulting solid disc was tested mechanically as previously described. The Co/EPON-828 system had a flexural strength of 19,700 psi compared to 20,500 psi for an EPON-828 control system containing no metal additive. The addition of cobalt ions to this epoxide did not improve the mechanical properties of the polymer. Attempts to incorporate higher concentrations of cobalt ions into EPON-828 resulted in insolubility of the cobalt complex and non-uniformity of specimens. It is therefore concluded that the success of the present invention appears to be acquired by use of cobalt ions in the presence of an MY-720 based epoxy.

SPECIFIC EXAMPLES

EXAMPLE I

To a solution of 5.6 g Narmco 5208 epoxy resin and 3.4 g of methyl ethyl ketone (MEK) was added 0.333 g $Co(acac)_3$. The blackish green solution was stirred for approximately two hours at room temperature until the solution became an opalescent green. Subsequently, 7.9 g of the mixture was poured into a 2¼ inch diameter aluminum pan and degassed in a vaccum oven at 120°–135° C. for approximately 50 minutes. The vacuum was released and the system was returned to atmosphere for the remainder of the cure. The oven temperature was increased to 150° C. over a 2-hour period then held for one hour at 150° C. The recovered cured resin disc was removed from the oven to cool in a dessicator. The following day the disc was post cured for three hours at 175°–177° C. The resulting transparent, reddish brown Co(III) ion-containing disc had a concentration of 5.6% $Co(acac)_3$ (a mole ratio of 1 Co(III) ion to every 10 MY-720 repeat units in the polymer). This Co(III)/epoxy showed a 95% improvement in flexural strength over the Narmco 5208 control epoxy. This improvement was obtained at no sacrifice in other polymer properties such as density or thermal stability.

EXAMPLE II

An epoxide mixture comprising 3.7 g MY-720, 0.3 g SU-8 and 2.0 g MEK was stirred at room temperature for approximately three hours until dissolved. A Co/amine premix comprising 0.059 g Co(acac)$_3$, 1.0 g 4,4'-DDS and 3.5 g MEK was prepared by room temperature stirring for approximately 6 hours until opalescent green. A final epoxy solution was prepared by adding the epoxide mixture to the Co/amine premix and stirring at room temperature for approximately 6 hours. Subsequently, 9.45 g of the final mixture was poured into a 2¼ inch aluminum pan and degassed for approximately 45 min. at 115°–125° C. under vacuum. Vacuum was released and the oven temperature was increased to 150° C. over three hours where it was held for one hour. The recovered cured resin disc was removed from the oven to cool in a dessicator. This epoxy disc was post-cured for two hours at 175° C.–177° C. then again removed to cool in a dessicator. The resulting transparent topaz disc had a concentration of 1.2% by weight Co(acac)$_3$ (a mole ratio of 1 Co(III) ion to every 50 MY-720 repeat units in the polymer). This Co(III)/epoxy showed a 44% improvement in flexural strength over an MY-720/DDS/SU-8 control.

EXAMPLE III

The process of Example II was repeated using 0.118 g Co(acac)$_3$ in the Co/amine premix to produce a Co ion-containing epoxy with improved flexural strength. The system contained 2.3% Co(acac)$_3$ by weight and had a mole ratio of 1:25 Co(III) ions to polymer repeat units.

EXAMPLE IV

The process of Example II was repeated using 0.296 g Co(acac)$_3$ in the Co/amine premix to produce a Co ion-containing epoxy with slightly improved flexural strength. The system contained 5.6% Co(acac)$_3$ by weight and had a mole ratio of 1:10 Co(III) ions to polymer repeat units.

EXAMPLE V

The process of Example II was repeated using 0.592 g Co(acac)$_3$ in the Co/amine premix to produce a Co ion-containing epoxy with improved flexural strength. The system contained 10.9% Co(acac)$_3$ by weight and had a mole ratio of 1:5 ratio Co(III) ions to MY-720 repeat units in the polymer.

EXAMPLE VI

An epoxy/amine mixture comprising 18.6 g MY-720, 5.2 g DDS, and 12.7 g MEK was stirred at room temperature for several hours until in solution. A Co/SU-8 premix was prepared by dissolving 6 g SU-8 in 10 g MEK at room temperature followed by the addition of 5.2 g Co(acac)$_3$ with continued stirring. The final epoxy solution was prepared by mixing 7.3 g of the epoxy/amine solution with 1.1 g of the premix and stirring at room temperature for 5½ hrs. until opalescent green. This final solution was poured into a 2¼ inch aluminum pan, and placed in a vacuum oven for degassing from 120°–125° C. for approximately 55 minutes. Vacuum was released and the curing temperature was increased to 150° C. over 3½ hours with a hold at 150° C. for 1½ hours. The disc was removed from the oven to cool in a dessicator. The disc was post cured for two hours at 175°–177° C. The resulting transparent reddish brown disc had a concentration of 5.6% Co(acac)$_3$ by weight. This Co(III)/epoxy showed a 45% improvement in flexural strength over an MY-720/DDS/SU-8 control.

The foregoing specific examples are merely to illustrate the present invention in exemplary fashion and are not intended, or to be interpreted, as exhaustive.

The specific TGMDA and epoxidized novolacs shown in the schematic reactions and described in the specific examples herein are also exemplary only and are intended merely to illustrate the reaction. It is to be understood that any TGMDA and epoxidized novolac combination, when having cobalt (III) ions chemically incorporated therein exhibits improved mechanical strength properties, is considered within the scope of the present invention.

Thus, various modifications and variations of the present invention will be apparent to those skilled in the art without departing from the spirit and scope of the appended claims.

What is claimed as new and desired to be secured by Letters Patent of the United States is:

1. A method of improving the mechanical property characteristics of a cured epoxy resin comprising:
   providing an epoxy resin based on a tetrafunctional epoxide;
   mixing a cobalt (III) ion-containing complex to the epoxy resin in a solvent;
   degassing the cobalt ion-containing mixture in the temperature range of 115°–135° C. to remove the solvent;
   curing the degassed mixture in the temperature range of 120°–150° C. to recover a cured resin product; and,
   post curing the recovered resin product in the temperature range of 175°–177° C. to yield a final cobalt (III) epoxy resin product having improved physical property characteristics over that of the epoxy resin alone.

2. The method of claim 1 wherein cobalt (III) ion containing complex is tris(acetylacetonato) cobalt (III).

3. The method of claim 1 wherein the solvent is methyl ethyl ketone.

4. The method of claim 1 wherein the solvent is a single solvent or a mixture of solvents selected from the group consisting of: methyl ethyl ketone, acetone, toluene, xylene and methyl isobutyl ketone.

5. The method of claim 1 wherein the degassing step in the temperature range of 115°–135° C. is conducted under vacuum for 45–55 minutes.

6. The method of claim 1 wherein the curing step in the temperature range of 120°–150° C. comprises gradually increasing the mixture temperature to 150° C. over a two-hour period and maintaining the 150° C. temperature for an additional hour.

7. The method of claim 1 wherein the post curing step is conducted after the cured resin product has been permitted to cool to ambient in a dessicator and remained therein for approximately 24 hours, and thereafter subjected to the post cure temperature range of 175°–177° C. for approximately three hours.

8. The method of claim 1 wherein the epoxy resin provided is bis-4-N,N-bis(2,3-epoxypropyl)phenylmethane or tetraglycidylmethylenedianiline.

9. The method of claim 1 wherein the epoxy resin provided is admixed with an aromatic diamine curing agent and an epoxidized phenolic novolac.

10. The method of claim 9 wherein the aromatic diamine is 4,4-diaminophenylsulfone.

11. The method of claim 9 wherein the epoxidized phenolic novolac is:

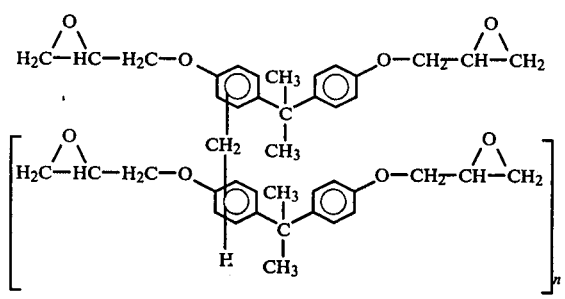

where n = 1,2,3,4 ...
(Average = about 3)

12. A method of making a cured epoxy resin product having improved mechanical strength property characteristics comprising:
providing an epoxide mixture of essentially a 10–1 ratio (by weight) of tetraglycidyl 4,4'-diaminodiphenylmethane to a phenolic novolac dissolved in a solvent,
combining a quantity of tris(acetylacetonato) cobalt (III) with a diamine curing agent in a solvent to form a premix,
adding the epoxide mixture to the cobalt/amine premix and stirring at room temperature for approximately six hours,
heating the stirred mixture to 115°–125° C. and maintaining under vacuum for approximately 45 minutes,
releasing the vacuum and gradually increasing the temperature to 150° C. over a period of three hours and thereafter maintaining this temperature for an additional hour to effect curing of the epoxy,
placing the recovered cured cobalt/epoxy in a dessicator and permitting it to cool to room temperature,
post curing the cobalt/epoxy by heating for two hours in the 175°–177° C. temperature range and again cooling to room temperature to recover a Co(III)/epoxy product having improved flexural strength over that of a control epoxy free of cobalt (III) ions.

13. The product obtained from the method of claim 12 wherein the mole ratio of the Co(III) ions to repeat units of the tetraglycidyl 4,4'-diaminodephenylmethane repeat units therein is in the range of from 1:5 to 1:50 and the improved flexural strength thereof is improved by 10–95% over that of a control epoxy free of cobalt (III) ions.

14. A method of making a cured epoxy resin product having improved material strength property characteristics comprising:
(a) preparing an epoxy/amine solution of essentially 3:1:2 by weight ratio of tetraglycidylmethylenedianiline (TGMDA), 4,4'-diaminodiphenylsulfone and methyl ethyl ketone;
(b) preparing a cobalt/phenolic epoxidized novolac premix by dissolving a phenolic epoxidized novolac in methyl ethyl ketone in a 6:10 ratio by weight; and adding thereto 5.2 parts, by weight, of tris-(acetylacetonato) cobalt III;
(c) mixing 7.3 parts by weight of the epoxy/amine solution prepared in step (a) with 1.1 parts of the premix prepared in step (b) and
(d) curing the mix obtained in step (c) with heat and vacuum to yield a Co(III)/epoxy product that exhibits a pronounced improvement in flexural strength over a control epoxy resin product prepared in the same manner in the absence of the cobalt (III) ions.

15. The method of claim 9 wherein the aromatic diamine curing agent is selected from the group consisting of any of the isomers of diaminophenylsulfone, diaminodiphenyl methane, diaminobenzophenone, oxydianiline, diaminodiphenylsulfide and phenylenediamine.

* * * * *